US010365914B2

United States Patent
DeMaris et al.

(10) Patent No.: US 10,365,914 B2
(45) Date of Patent: Jul. 30, 2019

(54) PROVIDING AUTOMATIC DETECTION AND OPTIMIZATION OF USER EXPERIENCE UPGRADES BASED ON DETECTED CUSTOMIZATION

(71) Applicant: MICROSOFT TECHNOLOGY LICENSING, LLC, Redmond, WA (US)

(72) Inventors: John Lincoln DeMaris, Seattle, WA (US); Jeremy Mazner, Seattle, WA (US); Zhenguang Chen, Sammamish, WA (US); Constantin Dan Stanciu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 234 days.

(21) Appl. No.: 15/194,636

(22) Filed: Jun. 28, 2016

(65) Prior Publication Data

US 2017/0322795 A1 Nov. 9, 2017

Related U.S. Application Data

(60) Provisional application No. 62/330,899, filed on May 3, 2016.

(51) Int. Cl.
*G06F 9/445* (2018.01)
*G06F 8/65* (2018.01)
(Continued)

(52) U.S. Cl.
CPC .............. *G06F 8/65* (2013.01); *G06F 8/71* (2013.01); *H04L 67/10* (2013.01); *H04L 67/34* (2013.01); *G06F 9/46* (2013.01); *G06F 9/54* (2013.01)

(58) Field of Classification Search
CPC ...... G06F 8/65; G06F 8/71; G06F 9/46; G06F 9/54; H04L 67/34; H04L 67/10
(Continued)

(56) References Cited

U.S. PATENT DOCUMENTS 5,809,287 A 9/1998 Stupek et al.
5,845,128 A 12/1998 Noble et al.
(Continued)

FOREIGN PATENT DOCUMENTS

EP 1019807 A2 7/2000
WO 03083688 A1 10/2003

OTHER PUBLICATIONS

Balkhi, Syed, "How to Update a WordPress Theme without Losing Customization", Retrieved on: May 5, 2016 Available at: http://www.wpbeginner.com/wp-themes/how-to-update-a-wordpress-theme-without-losing-customization/.
(Continued)

*Primary Examiner* — Wei Y Zhen
*Assistant Examiner* — Mohammed N Huda
(74) *Attorney, Agent, or Firm* — Michael Best & Friedrich LLP

(57) ABSTRACT

Providing an automatic detection and an optimization of user experience upgrades based on detected customization may be described. A new version of an application may be executed on a computing device in conjunction with a detection services. The new version of the application may include user experience changes. Customizations associated with a user experience of a previous version of the application for users may be determined. In response to a determination that at least one customized feature of the previous version of the application is incompatible with the new version of the application, the user experience of the previous version of the application may be provided to the
(Continued)

users. In response to a determination that the customizations of the previous version of the application are compatible with the new version of the application, the user experience of the new version of the application may be provided to the users.

20 Claims, 7 Drawing Sheets

(51) Int. Cl.
    *H04L 29/08*     (2006.01)
    *G06F 8/71*     (2018.01)
    *G06F 9/46*     (2006.01)
    *G06F 9/54*     (2006.01)

(58) Field of Classification Search
    USPC .......................................................... 717/170
    See application file for complete search history.

(56) References Cited

U.S. PATENT DOCUMENTS

| | | |
|---|---|---|
| 6,367,077 B1 | 4/2002 | Brodersen et al. |
| 6,389,591 B1 | 5/2002 | Andrew |
| 7,984,424 B2 | 7/2011 | Dengler et al. |
| 8,091,081 B2 | 1/2012 | Thorson et al. |
| 8,122,377 B2 | 2/2012 | Jindal et al. |
| 8,689,208 B2 | 4/2014 | Kern et al. |
| 8,898,627 B2 | 11/2014 | Gass et al. |
| 9,069,607 B1 | 6/2015 | Gopalakrishna Alevoor et al. |
| 9,128,797 B2 | 9/2015 | Zheng et al. |
| 9,274,790 B2 | 3/2016 | Marimuthu et al. |
| 2005/0203975 A1 | 9/2005 | Jindal et al. |
| 2006/0026268 A1 | 2/2006 | Sanda |
| 2009/0017812 A1 | 1/2009 | Chan et al. |
| 2014/0304694 A1 | 10/2014 | Huff et al. |
| 2015/0088968 A1* | 3/2015 | Wei et al. ............... H04L 67/34 709/203 |
| 2016/0072913 A1* | 3/2016 | Baldwin ................. H04L 67/34 709/201 |

OTHER PUBLICATIONS

"International Search Report and Written Opinion Issued in PCT Application No. PCT/US2017/029732", dated Jul. 20, 2017, 17 Pages.

* cited by examiner

PROVIDING AUTOMATIC DETECTION AND OPTIMIZATION OF USER EXPERIENCE UPGRADES BASED ON DETECTED CUSTOMIZATION

CROSS-REFERENCE TO RELATED APPLICATION

This Application claims priority under 35 U.S.C. § 119(e) to U.S. Provisional Patent Application Ser. No. 62/330,899 filed on May 3, 2016. The disclosure of the U.S. Provisional Patent Application is hereby incorporated by reference in its entirety.

BACKGROUND

User experiences of hosted applications, such as collaboration applications or productivity applications, may be customized. User experience elements, such as menus, buttons, and application colors may be changed or extended through declarative means. In some examples, the user experience elements may be modified by deploying custom code.

When the user experience of the application is updated or upgraded, many changes may be incremental (e.g., a new feature may be added or changed, while leaving the surrounding application intact). Occasionally, the user experience of the application may change significantly, resulting in a change in the foundation upon which the customizations operate. In such scenarios, the customizations that were in place before the user experience was updated and/or was upgraded may no longer work.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing an automatic detection and an optimization of user experience upgrades based on detected customization. A new version, of an application may be executed on a computing device in conjunction with a detection service, lire new version of the application may include user experience changes. Customizations associated with a user experience of a previous version of the application for users may be determined. In response to a determination that at least one customized feature of the previous version of the application is incompatible with the new version of the application, the user experience of the previous version of the application may be provided to the users. In response to a determination that the customizations of the previous version of the application are compatible with the new version of the application, the user experience of the new version of the application may be provided to the users.

These and other features and advantages will be apparent from a reading of the following detailed description and a review of the associated drawings. It is to be understood that both the foregoing general description and the following detailed description, are explanatory and do not restrict aspects as claimed.

DETAILED DESCRIPTION

Figure 1:
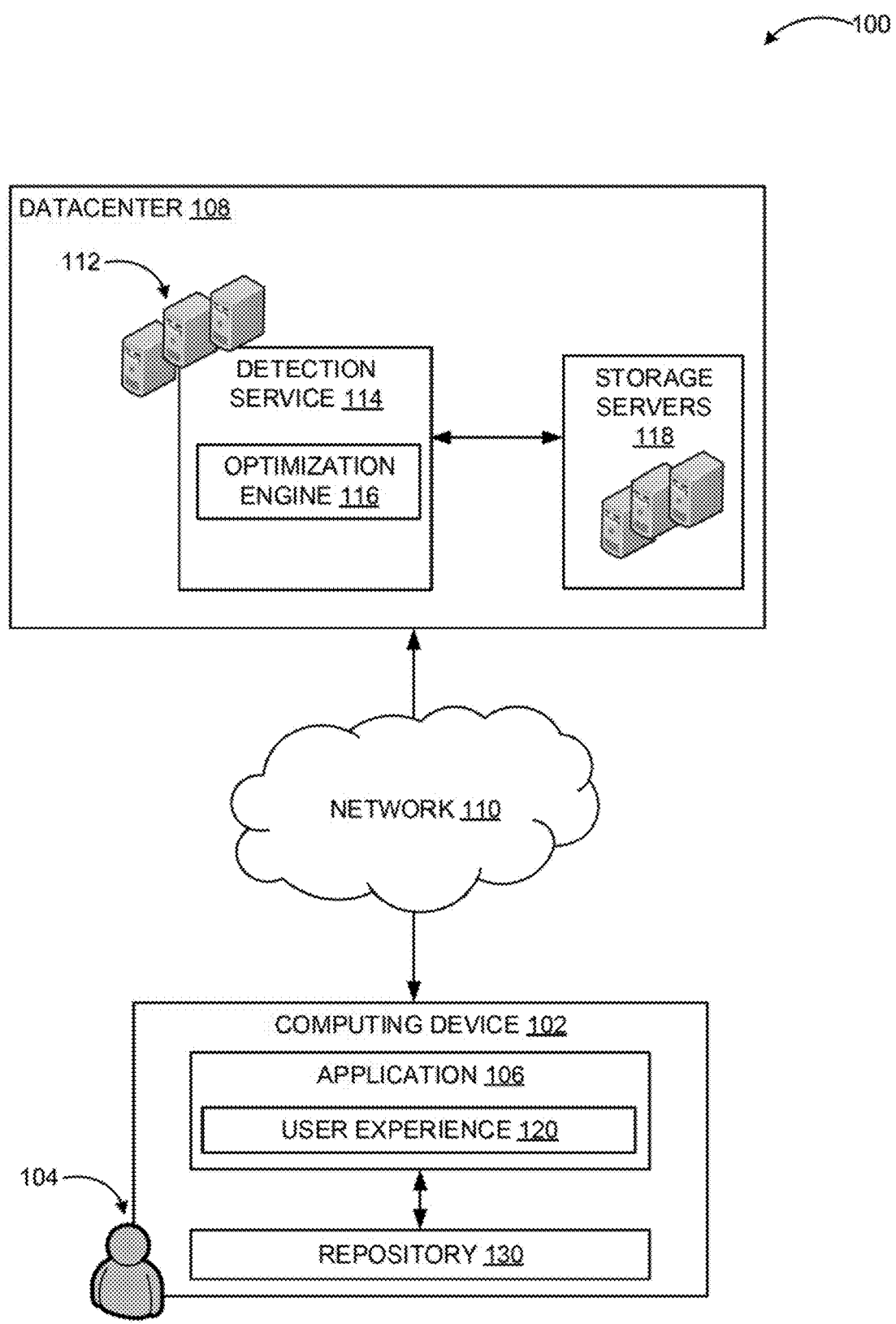
FIG. 1 is a conceptual diagram illustrating an example computing environment, for providing an automatic detection and an optimization of user experience upgrades based on detected customization, according to embodiments.

As briefly described above, providing an automatic detection and an optimization of user experience upgrades based on detected customization may be described. A new version of an application may be executed on a computing device in conjunction with a detection service. The new version of the application may include user experience changes. Customizations associated with a user experience of a previous version of the application for users may be determined. In response to a determination that at least one customized feature of the previous version of the application is incompatible with the new version of the application, the user experience of the previous version of the application may be provided to the users. In response to a determination that the customizations of the previous version of the application are compatible with the new version of the application, the user experience of the new version of the application may be provided to the users.

According to other examples, the customizations associated with the user experience of the previous version of the application may include a theme customization, a color scheme customization, a shading customization, a menu customization, a button customization, a graphical scheme customization, a control element customization, a customization to a behavior of the control element, a functionality customization, a behavior customization, and a combination thereof. In other examples, the customizations may be at one of a user level, a group level and an enterprise level. In additional examples, the previous version of the application is a down-level version of the application.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that ran s on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing an automatic detection and an optimization of user experience upgrades based on detected customization. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common-services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming, interface (API) may be a set of routines, protocols, and tools for an application or service that allow the application or service to interact or communicate with one or more other applications and services managed by separate entities.

While example implementations are described using user experience customizations herein, embodiments are not limited to user experience customizations. Providing an automatic detection and an optimization of user experience upgrades based on detected customization may be implemented in other environments, such as in other hosted services, collaboration services, and productivity services.

Specifically, a system is described for upgrading the user experience of applications or services. The system additionally allows for an improvement of the user experience for the users and environments that are not customized, while leaving the business-critical functionality of customized environments intact. Such a system may rely on the application/service being able to host a particular page or a screen, while using either the newest version of the user experience or a down-level version of the user experience. When a user requests the page or the screen, the system may detect whether any customizations are present that rely on the down-level version of the user experience. If one of these customizations are detected, then the down-level user experience may be provided to the user. If none of these customizations are detected, then the newest version of the user experience may be provided. The technical advantages of providing an automatic detection and an optimization of user experience upgrades based on detected customization may include improved user efficiency and user experience interaction by enabling users and enterprises to continue using custom functionality while upgrading other users to a newest version of an application or service.

Embodiments address a need that arises from very large scale operations created by networked computing and cloud based services that cannot be managed by humans. The actions/operations described herein are not a mere use of a computer, but address results of a system that is a direct consequence of software used as a service such as hosted services and/or detection services offered in conjunction with user experience customizations.

FIG. 1 is a conceptual diagram illustrating an example computing environment for providing an automatic detection and an optimization of user experience upgrades based on detected customization, according to at least some embodiments disclosed herein.

As illustrated in a diagram 100, an example system may include a datacenter 108. The datacenter 108 may host a detection service 114. The detection service 114 may provide an automatic detection and optimization of user experience upgrades based on detected customizations. The datacenter 108 may include processing servers 112. At least one of the processing servers 112 may execute an optimization engine 116 of the detection service 114, among other components. The datacenter 108 may also include storage servers 118. The storage servers 118 may be configured to manage one or more data stores. The one or more data stores may comprise data associated with the optimization engine 116. As described herein, the optimization engine 116 may be implemented as software, hardware, or a combination thereof.

According to some examples, the detection service 114 may be configured to be integrated with numerous applications. A user 104 may execute a thin version (e.g., a web browser) of an application 106 through a computing device 102. The computing device 102 may include a desktop computer, a laptop computer, a tablet computer, a smart phone, a vehicle mount computer, or a wearable computer, among other devices, in other examples, the user 104 may execute a thick version (e.g., a locally-installed version) of the application 106 through the computing device 102.

The detection service 114 may be configured, to interact with the application 106 over one or more networks, such as a network 110. The network 110 may comprise any topology of servers, clients, Internet service providers, and communication media. In some examples, the application 106 may be a productivity application. The productivity application may include a word-processing application, a spreadsheet application, a presentation application, or a notebook application, among other examples. According to other examples, the application 106 may be hosted by the detection service 114. A user experience 120 may facilitate communication over the network 110 and between the detection service 114 and the application 106.

In some examples, the application 106 may be executed on a server. The server may include a communication module, a memory, and a processor. The communication, module may be configured to facilitate communication between the detection service 114 and a plurality of client applications. The memory may be configured to store instructions. The processor may be coupled to the memory. The processor may be configured to execute, in conjunction with the instructions stored in the memory, the detection service 114 and the optimization engine 116 integrated with the detection service 114.

In some examples, when the user experience 120 of the application 106 is updated or upgraded, many features of the application 106 may be incremental. For example, a new feature may be added or a feature may be changed, while leaving the surrounding application intact. For the incremental changes, the customizations of the user experience 120 may continue to function as they have previously. However, the user experience 120 of the application 106 may change significantly in some scenarios, changing the foundation upon which the customizations operate. In such scenarios, the customizations that were in place before the user experience 120 was updated/upgraded may no longer work; this may pose a substantial challenge for enterprises that run business-critical functionality on cloud services, which upgrade their user experience frequently in a way that is not controlled by an administrator of the consuming enterprise.

To remedy this, the optimization engine 116 may detect a deployment of a new version of the application 106 executed on the computing de vice 102 in conjunction with the detection service 114. The new version of the application 106 may include user experience changes. The computing device 102 may also include a repository 130. The repository 130 may be configured to store a first list of customizations associated with the previous version of the application 106 and a second list of customizations associated with the new version of the application 106. The optimization engine 116 may determine customizations associated with the user experience 120 of a previous version of the application 106 for the user 104. The previous version of the application 106 may be a down-level version of the application.

Further, the optimization engine 116 may determine if at least one customized feature of the previous version of the application 106 is incompatible with the new version of the application 106. In other examples, the optimization engine 116 may provide the user experience 120 of the previous version of the application 106 to the user 104 in response to a determination that the at least one customized feature of the previous version of the application 106 is incompatible with the new version of the application 106. In some examples, the optimization engine 116 may provide the user experience 120 of the new version, of the application 106 to the user 104 in response to a determination that the customizations of the previous version of the application 106 are compatible with the new version of the application 106.

While the example system in FIG. 1 has been described with specific components including the computing device 102, the application 106, the datacenter 108, the processing server's 112, the detection service 114, the optimization engine 116, the storage servers 118, and the user experience 120, embodiments are not limited to these components or system configurations and can be implemented with other system configuration employing fewer or additional components.

Figure 2:
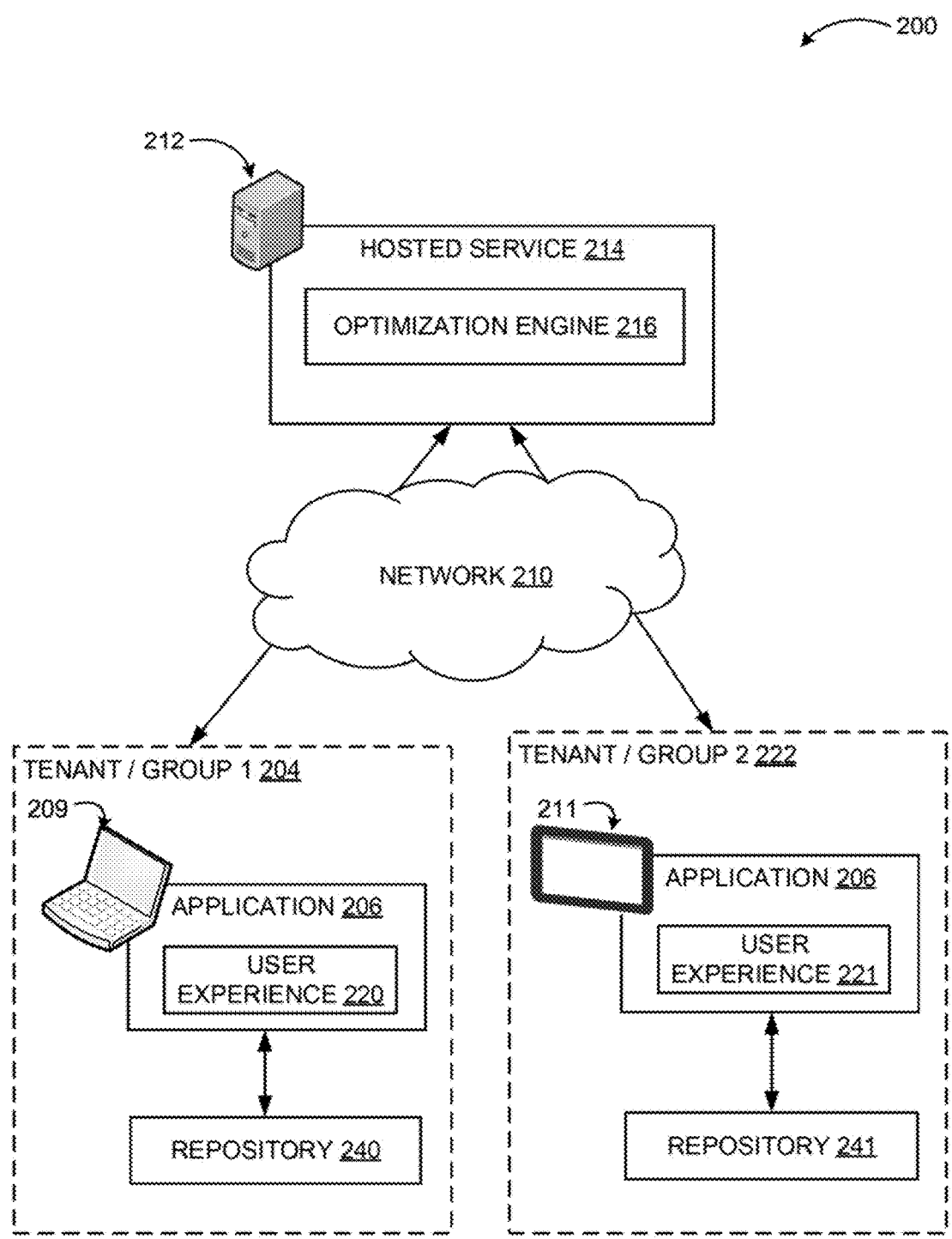
FIG. 2 is a conceptual diagram illustrating an example system configuration for providing an automatic detection and an optimization of user experience upgrades based on detected customization for a first tenant and based on detected customization for a second tenant, according to embodiments.

FIG. 2 is a conceptual diagram illustrating an example system configuration for providing an automatic detection and an optimization of user experience upgrades based on detected customization for a first tenant and based on detected customization for a second tenant, according to at least some embodiments disclosed herein.

As illustrated in a diagram 200, an example system may be described. The example system may include a hosted service 214 executed over a server 212. The server 212 may include a communication module, a memory configured to store instructions, and a processor. The processor may be coupled to the communication module and the memory. The processor may be configured to execute, in conjunction with the instructions stored in the memory, the hosted service 214 and an optimization engine 216 integrated with the hosted service 214.

The communication module may be configured to facilitate an exchange of communication over one or more networks, such as a network 110, between the hosted service 214 (e.g., a detection service) and a plurality of client applications. The hosted service 214 may be configured to interact with the application 206 over one or more networks, such as a network 110. The application 206 may include a word-processing application, a spreadsheet application, a presentation application, or a notebook application, among other applications. The network 110 may comprise any topology of servers, clients, Internet service providers, and communication media.

A first user experience 220 of a first computing device 209 may facilitate communication over the network 110 and between the hosted service 214 and the application 206. The first computing device 209 may further include a first repository 240. The first repository 240 is configured to store a first list of customizations associated with the previous version of the application 206 and a second list of customizations associated with the new version of the application 206.

A second user experience 221 of a second computing device 211 may facilitate communication over the network 210 and between the hosted service 214 and the application 206. The second computing device 211 may include a second repository 241. The second repository 241 is configured to store a first list of customizations associated with the previous version of the application 206 and a second list of customizations associated with the new version of the application 206. The previous version of the application 206 may be a down-level version of the application 206.

In some examples, a single instance of software may run on the server 212 and may serve multiple tenants; this may be referred to as software multi-tenancy. In some examples, a first tenant 204 (or a first group of users) and a second tenant 222 (or a second group of users) may share a common access to the server 212. The first tenant 204 and the second tenant 222 may have specific access privileges to the software instance. In the multi-tenant architecture, the application 206 may be designed to provide every tenant (e.g., the first tenant 204 and the second tenant 222) a dedicated, share of the software instance, which may include data associated with the software instance, a configuration of the software instance, non-functional properties of the software instance, and tenant individual functionality of the software instance.

The first tenant 204 (or the first group of users) may execute a thin version (e.g., a web browser) of the application 206 through the first computing device 209. In other examples, the first tenant 204 may execute a thick version (e.g., a locally-installed version) of the application 206 through the first computing device 209. In other examples, the second tenant 222 (or the second group of users) may execute the thin version (e.g., a web browser) of the application 206 through, the second computing device 211. In further examples, the second tenant 222 may execute a thick version (e.g., a locally-installed version) of the application 206 through the second computing device 211.

In some examples, the first tenant 204 may include one or more users in a first department of a corporation (e.g., a legal department). The second tenant 222 may include one or more users of a second department of the corporation (e.g., a human resources department). According to some examples, the optimization engine 216 may determine a first set of customizations associated with a first user experience 220 of a previous version of the application 206 for the first tenant 204, which may include a theme customization and a color scheme customization. The optimization engine 216 may also determine a second set of customizations associated with a second user experience 221 of the previous version of the application 206 for the second tenant 222, which may include a shading customization and a menu customization. The first set of customizations and the second set of customizations may differ, as the legal department may require different user experience customizations than the human resources department may require to execute job-related tasks.

Additional customizations associated with the user experience of the previous version of the application may include, a button customization, a graphical scheme customization, a control element customization, a customization to a behavior of the control element, a functionality customization, and a behavior customization, and a combination thereof. Further, the customizations may be at one of a user level, a group level and an enterprise level. The optimization engine 216 may distinguish the customizations by one or more schemes, such as a textual scheme, a graphical scheme, an audio scheme, an animation scheme, a coloring scheme, a highlighting scheme, and/or a shading scheme, among others.

The optimization engine 216 may then determine if at least one customized feature of the previous version of the application 206 for the first tenant 204 is incompatible with the new version of the application 206. In response to a determination that the at least one customized feature of the previous version of the application 206 for the first tenant 204 is incompatible with the new version of the application 206, the optimization engine 216 is further configured to provide the first user experience 220 of the previous version of the application 206 to the first tenant 204. In additional examples, the optimization engine 216 is further configured to determine if at least one customized feature of the previous version of the application 206 for the second tenant 222 is incompatible with the new version of the application 206. The optimization engine 216 is also configured to detect no customized features associated with the previous version of the application 206 associated with the second tenant 222. In response, the optimization engine 216 is further configured to provide the second user experience 221 of the new version of the application 206 to the second tenant 222.

Figure 3:
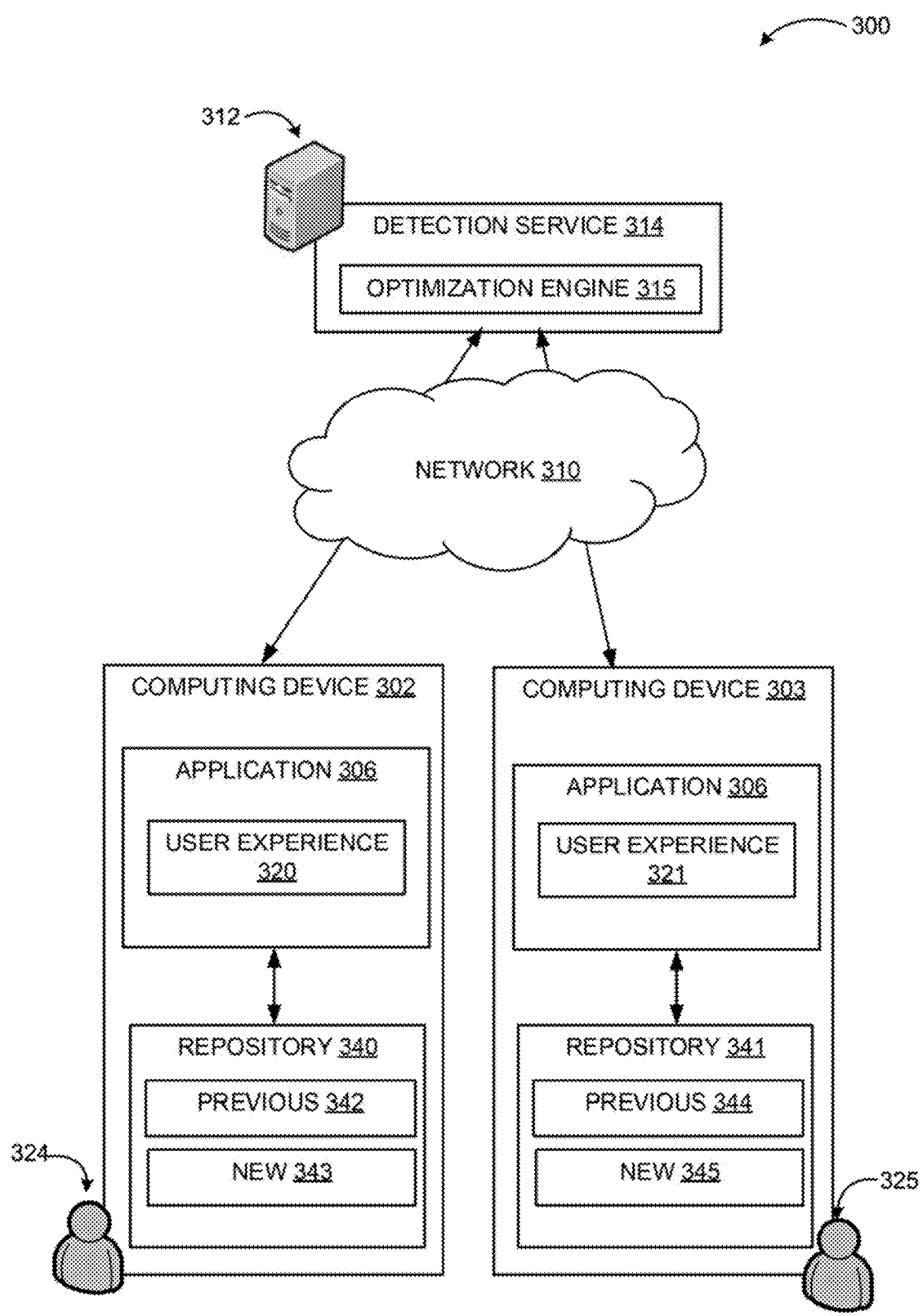
FIG. 3 is a conceptual diagram illustrating an example system configuration for performing a one-to-one comparison between each customized feature from a first list of customizations to each customized feature from a second list of customizations to determine if at least one customized feature of a previous version of an application is incompatible with a new version of the application, according to embodiments.

FIG. 3 is a conceptual diagram illustrating an example system configuration for performing a one-to-one comparison between each customized feature from a first list of customizations to each customized feature from a second list of customizations to determine if at least on customized feature of a previous version of an application is incompatible with a new version of the application, according to at least some embodiments disclosed herein.

As illustrated in a diagram 300, an example system may be described. The example system may include a detection service 314 executed over a sewer 312. The server 312 may include a communication module, a memory configured to store instructions, and a processor. The processor may be coupled to the communication module and the memory. The processor may be configured to execute, in conjunction with the instructions stored in the memory, the detection service 314 and an optimization engine 315 integrated with the optimization engine 315. The communication module may be configured to facilitate an exchange of communication a network 310 between the detection service 314 and a plurality of client applications (e.g., a first computing device 302 and a second computing device 303.

A first user 324 may execute a web browser of an application 306 through the first computing device 302. A first user experience 320 may facilitate communication over the network 310 and between the defection service 314 and the application 306. The first computing device 302 may also include a first repository 340. The first repository 340 may store a first list of customizations 342 and a second list of customizations 343. The first list of customizations 342 may be labeled "previous" by default and may be associated with the previous version of the application 306. The second list of the customizations 343 may be labeled "new" by default and may be associated with the new version of the application 306. The previous version of the application 306 may be a down-level version of the application.

The optimization engine 315 may be configured to perform a one-to-one comparison between each customized feature from the first list of customizations 342 to each customized feature from the second list of customizations 343 to determine if the at least one customized feature of the previous version of the application 306 is incompatible with the new version of the application 306. In further examples, the optimization engine 315 may implement an algorithm to perform the one-to-one comparison. The algorithm may include a comparison-based sorting algorithm, an approximate string matching algorithm, an intelligent learning algorithm, a machine learning algorithm, and/or machine learning techniques, among others.

The comparison-based sorting algorithm is a type of sorting algorithm that reads the list of elements through a single abstract comparison operation (e.g., a "less than or equal to" operator) that determines which of two elements should occur first in a final sorted list. Examples of comparison-based sorting algorithms include a quick sort algorithm, a heap sort algorithm, a merge son algorithm, an intro sort algorithm, an insertion sort algorithm, a selection sort algorithm, a bubble sort algorithm, a cycle sort algorithm, and a merge insertion sort algorithm, among others.

The approximate string matching algorithm finds approximate sub-string matches inside a given string and then finds dictionary strings that match the pattern approximately. The machine learning techniques may include pattern recognition and computational learning theory, among others. The machine learning algorithms may learn and make predictions. Common machine learning algorithms may include supervised, learning algorithms, unsupervised learning algorithms, and reinforcement learning algorithms. Some of the machine learning algorithms may include linear regression algorithms, logistic regression algorithms, decision tree algorithms, support vector machine (SVM) algorithms, Naive Bayes algorithms, a K-nearest neighbors (KNN) algorithm, a K-means algorithm, a random forest algorithm, dimensionality reduction algorithms, and a Gradient Boost & Adaboost algorithm, among others.

In yet other embodiments, incompatibility of features of a current version with past version(s) may be determined automatically, for example, through the use of heuristics. In one example, the list of compatible/incompatible extensions may be built or updated through a module that monitors every time a user manually chooses to revert to a previous version (e.g., clicking "back to classic") and employs machine learning or similar process to look at the customizations of applications where many users have made such a decisions. The monitoring module may look at the enabled extensions, for example, and determine if there is a strong correlation between a given extension being enabled on a particular version, of an application (or service) and users of that version of the application manually reverting. Where a correlation is found, the list of compatible/incompatible extensions may be automatically updated.

A second user 325 may execute a thin version of the application 306 through the second computing device 303. A second user experience 321 may facilitate communication over the network 310 and between the detection service 314 and the application 306. The second computing device 303 may also include a second repository 341. The second repository 341 may store a first list of customizations 344 and a second list of customizations 345. The first list of customizations 344 may be labeled "previous" by default and may be associated with the previous version of the application 306. The second list of the customizations 345 may be labeled "new" by default and may be associated with the new version of the application 306.

In some examples, the optimization engine 315 may be configured to perform a one-to-one comparison between each customized feature from the first list of customizations 344 to each customized feature from the second list of customizations 345 to determine if the at least one customized feature of the previous version of the application 306 is incompatible with the new version of the application 306. In further examples, the optimization engine 315 may implement an algorithm to perform the one-to-one comparison, as described with the first repository 340.

In some examples, the optimization engine 315 may detect a deployment of a new version of the application 306 executed on the first computing device 302 in conjunction with the detection service 314. The new version of the application 306 may include user experience changes. The optimization engine 315 may determine customizations associated with the first user experience 320 of a previous version of the application 306 for the first user 324. The customizations may also be applied to "out-of-the-box" features. The customizations associated with the first user experience 320 of the previous version of the application 306 may include one or more of a theme customization, a color scheme customization, a shading customization, a menu customization, a button customization, a graphical scheme customization, a control element customization, a customization to a behavior of the control element, a functionality customization, and a behavior customization, and a combination thereof. Further, the customizations may be at one of a user level, a group level, and an enterprise level. In some examples, the customizations may be detected by one of: modifications to source code of the application 306 and modifications to one or more modules associated with the detection service 314. In further examples, the customizations associated with the first user experience 320 may be detected by one or more of modifications to metadata, modifications to libraries associated with the application 306, and/or modifications to modules associated with the application 306.

Further, the optimization engine 315 may determine if at least one customized feature of the previous version of the application 306 is incompatible with the new version of the application 306. In other examples, the optimization engine 315 may receive a request from the first user 324 to view one of a web-page, a dialog, or a screen on the first user experience 320. In response, the optimization engine 315 may initiate a process to determine if the at least one customized feature of the previous version of the application 306 is incompatible with the new version of the application 306. In other examples, the optimization engine 315 may provide the first user experience 320 of the previous version of the application 306 to the first user 324 in response to a determination that the at least one customized feature of the previous version of the application 306 is incompatible with the new version of the application 306. In further examples, the optimization engine 315 may provide the first user experience 320 of the new version of the application 306 to the first user 324 in response to a determination that the customizations of the previous version of the application 306 are compatible with the new version of the application 306.

Figure 4:
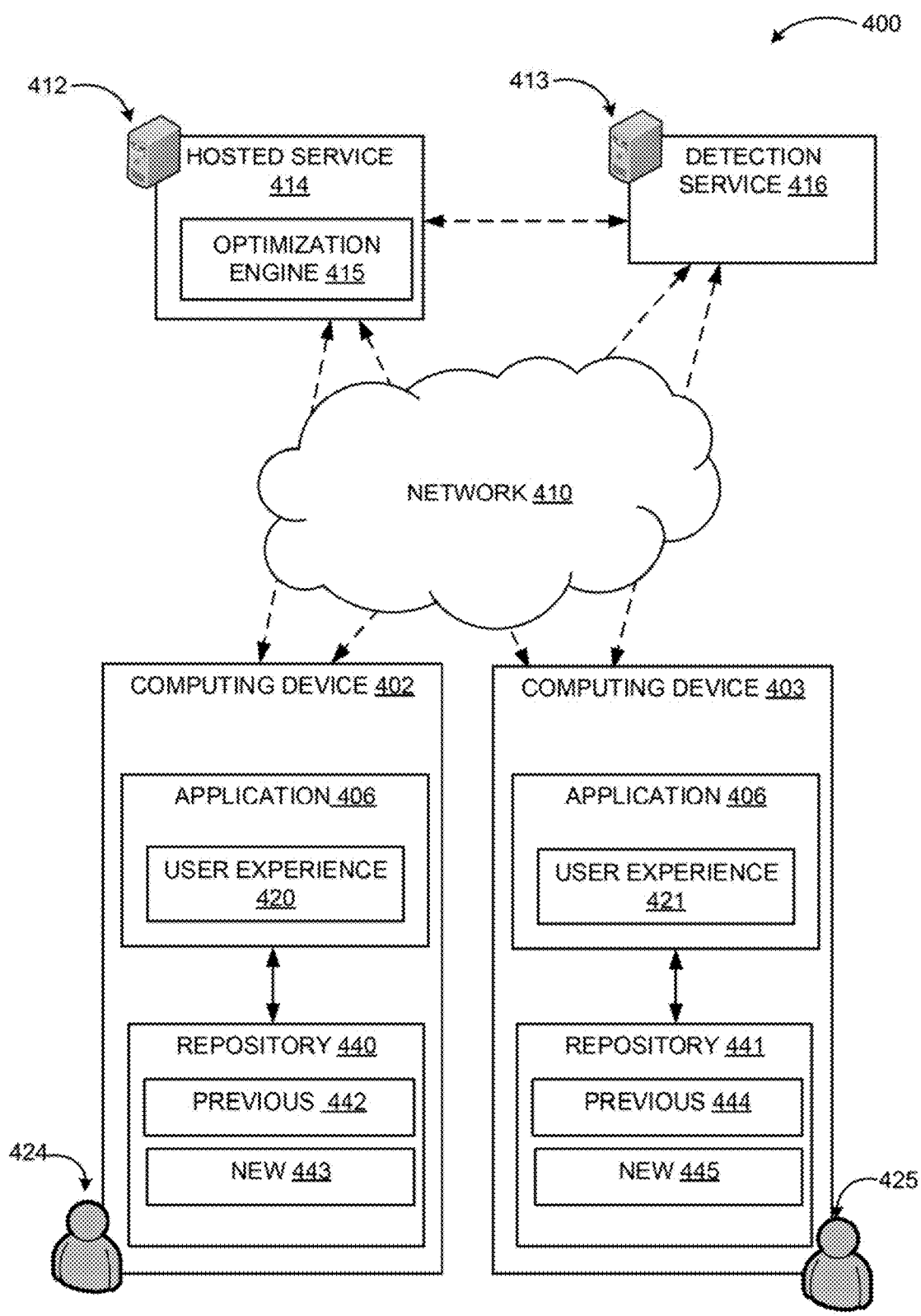
FIG. 4 is a conceptual diagram illustrating an example system configuration for utilizing a hosted service and a detection service to provide an automatic detection and an optimization of user experience upgrades based on detected customizations, according to embodiments.

FIG. 4 is a conceptual diagram illustrating an example system configuration for utilizing a hosted service and a detection service to provide an automatic detection and an optimization of user experience upgrades based on detected customizations, according to at least some embodiments disclosed herein.

As illustrated in a diagram 400, an example system may be described. The example system may include a detection service 416 executed over a server 413. The example system may also include a hosted service 414 executed over a server 412. The hosted service 414 and the detection service 416 may be configured to communicate with one another via one or modules and/or engines (e.g., communication modules). The hosted service 414 may be integrated with an optimization engine 415. The hosted service 414 and the detection service 416 may exchange communications over a network 410 to a first computing device 402 and a second computing device 403 through use of the one or more modules (e.g., the communication modules).

A first user 424 may execute a thin version of an application 406 through the first computing device 402. A first user experience 420 may facilitate communication over the network 410 and between the hosted service 414 and/or the detection service 416 and the application 406. The first computing device 402 may also include a first repository 440. The first repository 440 may store a first list of customizations 442 and a second list of customizations 443. The first list of customizations 442 may be labeled "previous" by default and may be associated with the previous version of the application. The second list of the customizations 443 may be labeled "new" by default and may be associated with the new version of the application 406.

The optimization engine 415 may be configured to perform a one-to-one comparison between each customized feature from the first list of customizations 442 to each customized feature from the second list of customizations 443 to determine if the at least one customized feature of the previous version of the application 406 is incompatible with the new version of the application 406. In further examples, the optimization engine 415 may implement an algorithm to perform the one-to-one comparison. The algorithm may include a comparison-based sorting algorithm, an approximate string matching algorithm, an intelligent learning algorithm, a machine learning algorithm, and/or machine learning, techniques, among others.

A second user 425 may execute a thin version of the application 406 through the second computing device 403. A second user experience 421 may facilitate communication over the network 410 and between the detection service 416 and/or the hosted service 414 and the application 406. The second computing device 403 may also include a second repository 441. The second repository 441 may store a first list of customizations 444 and a second list of customizations 445. The first list of customizations 444 may be labeled "previous" by default and may be associated with the previous version of the application 406. The second list of the customizations 445 may be labeled "new" by default and may be associated with the new version of the application 406. The optimization engine 415 may be configured to perform a one-to-one comparison between each customized feature from the first list of customizations 444 to each customized feature from the second list of customizations 445 to determine if the at least one customized feature of the previous version of the application 406 is incompatible with the new version of the application 406. In further examples, the optimization engine 415 may implement an algorithm to perform the one-to-one comparison, as described with the first repository 440.

In some examples, the optimization engine 415 may detect a deployment of a new version of the application 406 executed on the first computing device 402 in conjunction with the detection service 416. The new version of the application 406 may include user experience changes. The optimization engine 415 may determine customizations associated with, the first user experience 420 of a previous version of the application 406 for the first user 424. Further, the optimization engine 415 may determine if at least one customized feature of the previous version of the application 406 is incompatible with, the new version of the application 406. In other examples, the optimization engine 415 may provide the first user experience 420 of the previous version of the application 406 to the first user 424 in response to a determination that the at least one customized feature of the previous version of the application 406 is incompatible with the new version of the application 406. In further examples, the optimization engine 415 may provide the first user experience 420 of the new version of the application 406 to the first user 424 in response to a determination that the customizations of the previous version of the application 406 are compatible with the new version of the application 406.

The example scenarios and schemas in FIG. 1 through FIG. 4 are shown with specific components, data types, and configurations. Embodiments are not limited to systems according to these example configurations. Providing an automatic detection and an optimization of user experience upgrades based on detected customization may be implemented in configurations employing fewer or additional components. Furthermore, the example schema and components shown in FIG. 1 through FIG. 4 and their subcomponents may be implemented in a similar manner with other values using the principles described herein.

Figure 5:
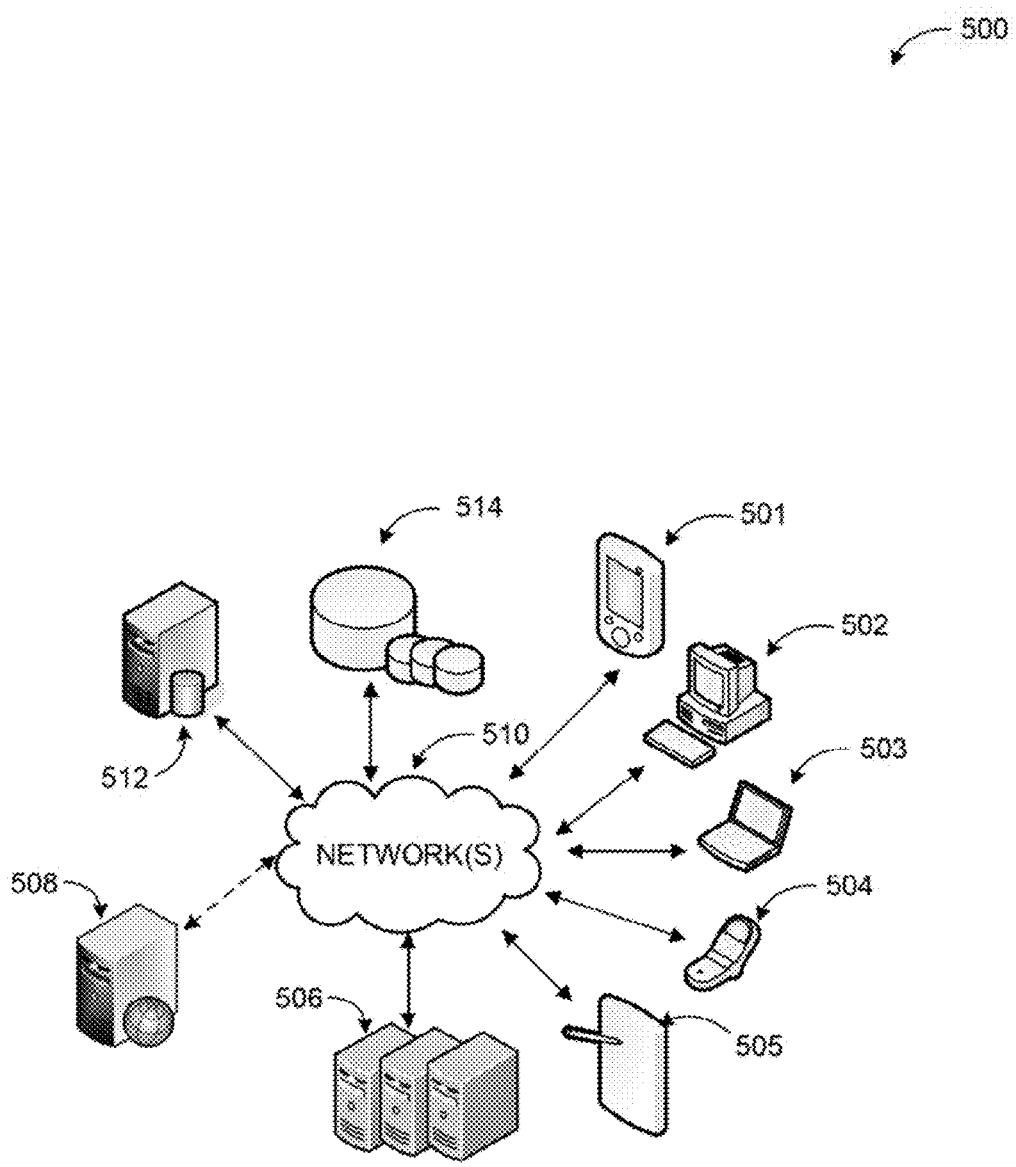
FIG. 5 is a simplified networked environment, where a system according to embodiments may be implemented.

FIG. 5 is a simplified networked environment, where a system according to embodiments may be implemented.

In addition to locally installed applications (e.g., the application 106 of FIG. 1), an optimization engine may also be employed in conjunction with hosted applications and services (e.g., a detection service) that may be implemented via software executed over one or more servers 506 or individual server 508, as illustrated in diagram 500. A hosted service or application may communicate with client applications on individual client devices 501-505, such as a handheld computer 501, a desktop computer 502, a laptop computer 503, a smart phone 504, and a tablet computer 505, among other client devices. The hosted service or the application may communicate with the applications through one or more networks 510 and present a user experience to a plurality of users.

The individual-client devices 501-505 may be used to access the functionality provided by the hosted service or the application. The one or more of the servers 506 or the individual server 508 may be used to provide a variety of services, as previously discussed. Relevant data may be stored in one or more data stores (e.g. a data store 514), which may be managed by the one or more servers 506 or by a database server 512.

The one or more networks 510 may comprise any topology of servers, clients, Interact service providers, and communication media. A system according to embodiments may have a static or dynamic topology. The one or more networks 510 may include a secure network such as an enterprise network, an unsecure network such as a wireless open network, or the Internet. The one or more networks 510 may also coordinate communication, over other networks, such as PSTN or cellular networks. The one or more networks 510 may provide communication between the nodes, as described herein. By way of example, and not limitation, the one or more networks 510 may include wireless media such as acoustic, RF, infrared and other wireless media.

Many other configurations of computing devices, applications, engines, data sources, and data distribution systems may be employed for providing an automatic detection and an optimization of user experience upgrades based on detected customization. Furthermore, the networked environments discussed in FIG. 5 are for illustration purposes only. Embodiments are not limited to the example applications, engines, or processes.

Figure 6:
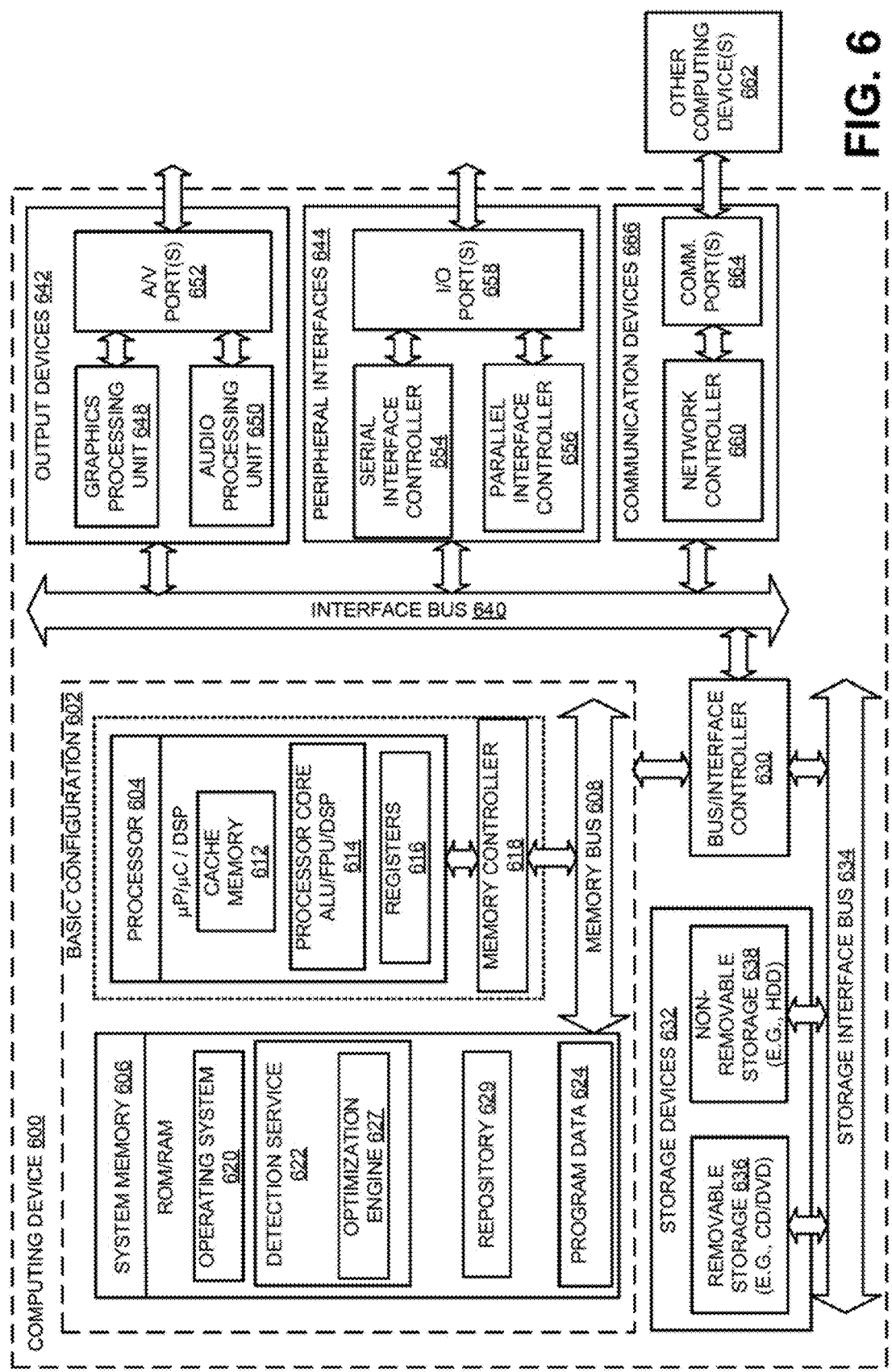
FIG. 6 is a block diagram of an example computing device, which may be used for providing an automatic detection and an optimization of user experience upgrades based on detected customization, according to embodiments.

FIG. 6 is a block diagram of an example computing device, which may be used for pro viding an automatic detection and an optimization of user experience upgrades based on detected customization, according to embodiments.

For example, a computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The example basic configuration 602 may be illustrated in FIG. 6 by those components within the inner dashed line.

Depending on the desired configuration, the processor 604 may be of any type, including hut not limited to a microprocessor (μP), a microcontroller (μC), a digital signal processor (DSP), or any combination thereof. The processor 604 may include one more levels of caching, such as a level cache memory 612, one or more processor cores 614, and registers 616. The one or more processor cores 614 may (each) include an arithmetic logic unit (ALU), a floating point unit (FPU), a digital signal processing core (DSP Core), or any combination thereof. An example memory controller 618 may also be used with the processor 604, or in some implementations, the example memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a detection service 622, a repository 629, and a program data 624. The detection service 622 may include an optimization engine 627, which may be an integrated module of the detection service 622. The optimization engine 627 may be configured to detect a deployment of a new version, of an application executed on a computing device in conjunction with the detection service. The new version of the application may include user experience changes. The optimization engine 627 may also determine customizations associated with a user experience of a previous version of the application for one or more users and may determine if at least one customized feature of the previous version of the application is incompatible with the new version of the application. Further, the optimization engine 627 may provide the user experience of the previous version of the application to the one or more users in response to a determination that the at least one customized feature of the previous version of the application is incompatible with the new version of the application In other examples the optimization engine 627 may provide the user experience of the new version of the application to the one or more users in response to a determination that the customizations of the previous version of the application are compatible with the new version of the application. The program data 624 may include customization data, as described herein.

The repository 629 may be configured to store a first list of customizations associated with the previous version of the application and a second list of customizations associated with the new version of the application. The optimization engine 627 may be further configured to perform a one-to-one comparison between each customized feature from the first list of customizations to each customized feature from the second list of customizations to determine if the at least one customized feature of the previous version of the application is incompatible with the new version of the application. In some examples, an algorithm may be implemented to perform the one-to-one comparison. In further examples, the algorithm may include one of: a comparison-based sorting algorithm, an approximate string matching algorithm, an intelligent learning algorithm, and a machine learning algorithm.

The computing device 600 may have additional features or functionality, and additional interfaces to facilitate communications between the example basic configuration 602 and any desired devices and interfaces. For example, a bus/interface controller 630 may be used to facilitate communications between the example basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the example basic configuration 602 via the bus/interlace controller 630. Some of the one or more output devices 642 include a graphics processing unit 648 and an audio processing unit 650, which may be configured to communicate to various external devices such as a display or speakers via one or more A/V ports 652. The one or more peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a earner wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized sewer, mainframe, or similar computer, which includes any of the above functions. The computing device 600 may also be implemented as a personal computer including both laptop computer and non-laptop computer configurations.

Example embodiments may also include methods for providing an automatic detection and an optimization of user experience upgrades based on detected customization. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program, in other embodiments, the human interaction can be automated such as by pre-selected criteria that may be machine automated.

Figure 7:
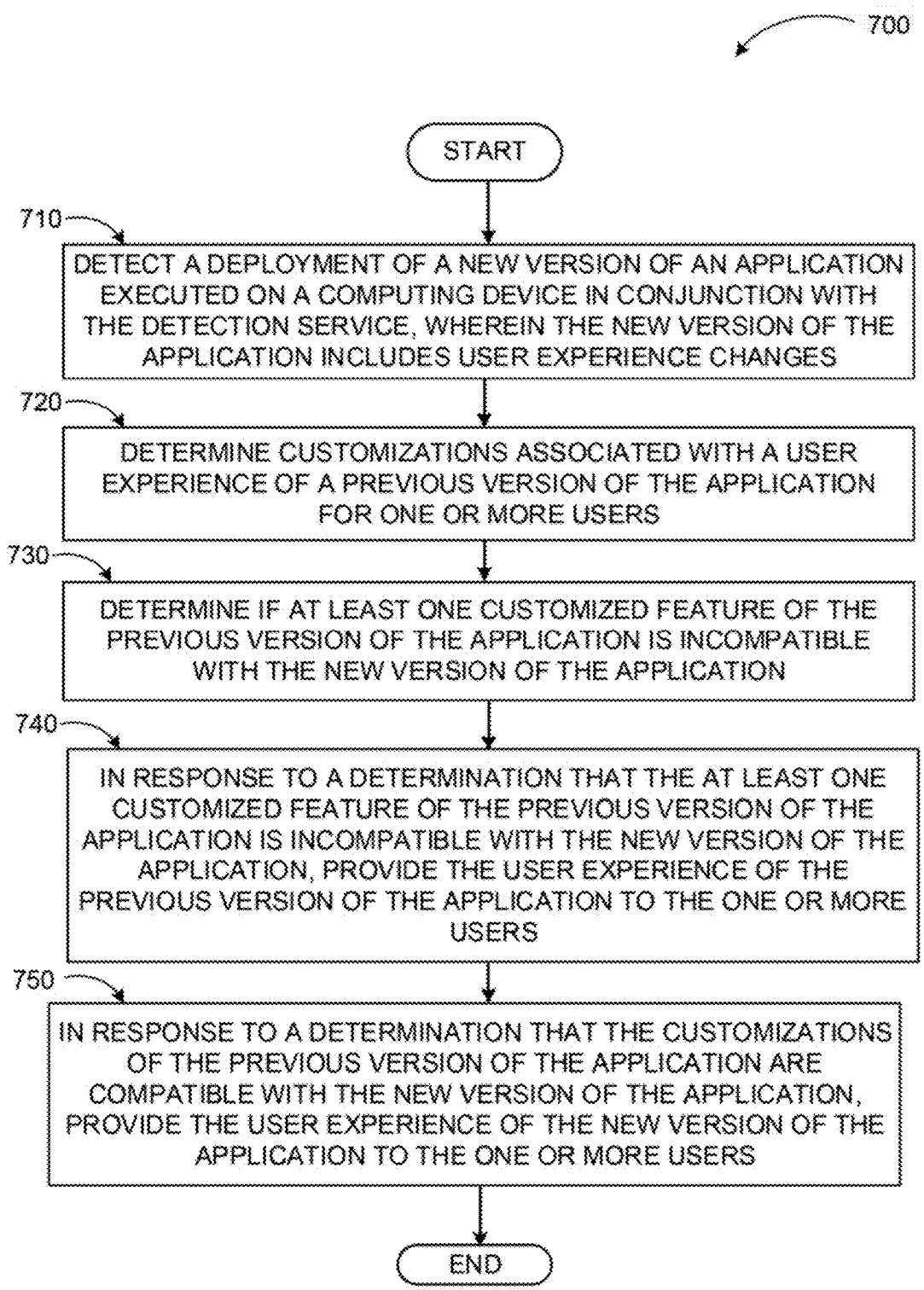
FIG. 7 is a logic flow diagram illustrating a process to provide an automatic detection and an optimization of user experience upgrades based on detected customization, according to embodiments.

FIG. 7 is a logic flow diagram illustrating a process for providing an automatic detection and an optimization of user experience upgrades based on detected customization, according to embodiments.

A process 700 may be implemented on a computing device (e.g., the computing device 600 in FIG. 6), a server, or with another system. In some examples, the system may include a server. The server may include components, such as a communication module, a memory, and a processor coupled to the memory. The communication module may be configured to facilitate an exchange of communication between a detection service and a plurality of client applications.

The memory may be configured to store instructions. The processor may be configured to execute, in conjunction with the instructions stored in the memory, the detection service and an optimization engine integrated with the detection service. The client device or the computing device may be associated with a user so that the user may execute customizations on the user experience.

The process 700 begins with operation 710, where the optimization engine may be configured to detect a deployment of a new version of an application executed on a computing device in conjunction with the detection service. The new version of the application may include user experience changes, in other examples, the optimization engine may be further configured to detect the customizations associated with the user experience by modifications to source code of the application or modifications to one or more modules associated with the detection service.

At operation 720, the optimization engine may be configured to determine customizations associated with a user experience of a previous version of the application for one or more users. The customizations associated with the user experience of the previous version of the application may include one or more of a theme customization, a color scheme customization, a shading customization, a menu customization, a button customization, a graphical scheme customization, a control element customization, a customization to a behavior of the control element, a functionality customization, and a behavior customization, and a combination thereof. The customizations may be at one of a user level, a group level, and an enterprise level.

At operation 730, the optimization engine may be configured to determine if at least one customized feature of the previous version of the application is incompatible with the new version of the application. In other examples, the computing device may include a repository configured to store a first list of customizations associated with the previous version of the application and a second list of customizations associated with the new version of the application. The optimization engine may be further configured to perform a one-to-one comparison between each customized feature from the first list of customizations to each customized feature from the second list of customizations to determine if the at least one customized feature of the previous version of the application is incompatible with the new version of the application. The one-to-one comparison may be performed by implementation of an algorithm. The algorithm may include one of a comparison-based sorting algorithm, an approximate string matching algorithm, an intelligent learning algorithm, and a machine learning algorithm.

At operation 740, the optimization engine may be configured to provide the user experience of the previous version of the application to the one or more users in response to a determination that the at least one customized feature of the previous version of the application is incompatible with the new version of the application. At operation 750, the optimization engine may be configured to provide the user experience of the new version of the application to the one or more users in response to a determination that the customizations of the previous version of the application are compatible with the new version of the application.

The operations included in process 700 are for illustration purposes. Providing an automatic detection and an optimization of user experience upgrades based on detected customization may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some embodiments, servers for providing an automatic detection and an optimization of user experience upgrades based on detected customization may be described. An example server may include a communication module, a memory, and a processor. The communication module may be configured to facilitate an exchange of communication, between a detection service and a plurality of client applications. The memory may store instructions. The processor may be coupled to the communication module and the memory. The processor may be configured to execute, in conjunction with the instructions stored in the memory, the detection service and an optimization engine integrated with the detection service. The optimization engine may be configured to detect a deployment of a new version of an application executed on a computing device in conjunction with the detection service. The new version of the application may include user experience changes. The optimization engine may also determine customizations associated with a user experience of a previous version of the application for one or more users and may determine if at least one customized feature of the previous version of the application is incompatible with the new version of the application. In response to a determination that the at least one customized feature of the previous version of the application is incompatible with the new version of the application, the optimization engine may also pro vide the user experience of the previous version of the application to the one or more users. In response to a determination that the customizations of the previous version of the application are compatible with the new version of the application, the optimization engine may also provide the user experience of the new version of the application to the one or more users.

According to other examples, the optimization engine may be further configured to detect no customized features associated with the previous version of the application and may provide the user experience of the new version of the application to the one or more users. According to some embodiments, the customizations associated with the user experience of the previous version of the application may include a theme customization, a color scheme customization, a shading customization, a menu customization, a button customization, a graphical scheme customization, a control element customization, a customization to a behavior of the control element, a functionality customization, a behavior customization, and a combination thereof.

According to further examples, the optimization engine may be at one of a user level, a group level, and an enterprise level. According to some other examples, the optimization engine may be further configured to detect the customizations associated with the user experience by modifications to source code of the application and/or modifications to one or more modules associated with, the detection service.

According to some examples, the computing device may include a repository configured to store a first list of customizations associated with the previous version of the application and a second list of customizations associated with the new version of the application. According to further examples, the optimization engine may be further configured to perform a one-to-one comparison between each customized feature from the first list of customizations to each customized feature from the second list of customizations to determine if the at least one customized feature of the previous version of the application is incompatible with the new version of the application. According to other examples, the optimization engine may be configured to implement an algorithm to perform the one-to-one comparison. According to further examples, the algorithm may include one of: a comparison-based sorting algorithm, an approximate string matching algorithm, an intelligent learning algorithm, and a machine learning algorithm.

According to some embodiments, a means for providing an automatic detection and an optimization of user experience upgrades based on detected customization may be described, which may include a means for detecting a deployment of a new version of an application executed on the computing device that includes user experience changes and a means for determining customizations associated with a user experience of a previous version of the application for one or more users. The customizations may be at one of a user level, a group level, and an enterprise level. The means for providing an automatic detection and an optimization of user experience upgrades based on detected customization may further include a means for determining if at least one customized feature of the previous version of the application is incompatible with the new version of the application. In response to a determination that the at least one customized feature of the previous version of the application is incompatible with the new version of the application, a means for providing the user experience of the previous version of the application to the one or more users may be described. In response to a determination that the customizations of the previous version of the application are compatible with the new version of the application, a means for providing the user experience of the new version of the application to the one or more users may be described.

According to further embodiments, methods executed on computing devices may be described. An example method executed on a computing device for providing an automatic detection and an optimization of user experience upgrades based on detected customization may be described. The example method may include detecting a deployment of a new version of an application executed on the computing device that includes user experience changes and determining customizations associated with a user experience of a previous version of the application for one or more users. The customizations may be at one of a user level, a group level, and an enterprise level. The example method may further include determining if at least one customized feature of the previous version of the application is incompatible with the new version of the application. In response to a determination that the at least one customized feature of the previous version of the application is incompatible with the new version of the application, the example method may further include providing the user experience of the previous version of the application to the one or more users. In response to a determination that the customizations of the previous version of the application are compatible with the new version of the application, the example method may further include providing the user experience of the new version of the application to the one or more users.

According to other embodiments, in response to receiving a request from a user to view one of a web-page or a screen on the user experience, the example method may further include initiating a process to determine if the at least one customized feature of the previous version of the application is incompatible with the new version of the application. According to some embodiments, the previous version of the application may be a down-level version of the application. According to further embodiments, the example method may further include detecting the customizations associated with the user experience by modifications to metadata, modifications to libraries associated with the application, and/or modifications to modules associated with the application.

According to additional embodiments, the example method may further include identifying the one or more users as a first department within a company and a second department within a company, determining a first set of customizations associated with a first-user experience of the previous version of the application for the first department, and determining a second set of customizations associated with a second user experience of the previous version of the application for the second department. According to some other embodiments, the example method may further include determining if at least one customized feature of the previous version of the application tor the first department is incompatible with the new version of the application and in response to a determination that the at least one customized feature of the previous version of the application for the first department is incompatible with the new version of the application, providing the user experience of the previous version of the application to the first department. According to some embodiments, the example method may further include determining if at least one customized feature of the previous version of the application for the second department is incompatible with the new version of the application, detecting no customized features associated with the previous version of the application associated with the second department, and providing the user experience of the new version of the application to the second department.

According to further embodiments, computing devices may be described. An example computing device configured to provide an automatic detection and an optimization of user experience upgrades based on detected customization may be described. The example computing device may include a memory configured to store instructions and one or more processors coupled to the memory. The one or more processors may be configured to execute, in conjunction with the instructions stored in the memory, an application associated with, a detection service. The application may be configured to detect a deployment of a new version of the application that includes user experience changes and determine customizations associated with a user experience of a previous version of the application for one or more users. The customizations may be at one of a user level, a group level, and an enterprise level. The application may also be configured to determine, if at least one customized feature of the previous version of the application is incompatible with the new version of the application. In response to a determination that the at least one customized, feature of the previous version of the application is incompatible with the new version of the application, the application may be further configured to provide the user experience of the previous version of the application to the one or more users. In response to a determination that the customizations of the previous version of the application are compatible with the new version of the application, the application may be configured to provide the user experience of the new version of the application to the one or more users.

According to some embodiments, the application may include one of a word-processing application, a spreadsheet application, a presentation application, and a notebook application, in some examples, the computing device may include a repository configured to store a first list of customizations associated with the previous version of the application and a second list of customizations associated with the new version of the application. According to other embodiments, the application may be further configured to perform a one-to-one comparison between each customized feature from the first list of customizations to each customized feature from the second list of customizations to determine if the at least one customized, feature of the previous version of the application is incompatible with the new version of the application. The algorithm may be implemented to perform the one-to-one comparison. The algorithm may include one of: a comparison-based sorting algorithm, an approximate string matching algorithm, an intelligent learning algorithm, and a machine learning algorithm.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A server to provide an automatic detection and an optimization of user experience upgrades based on detected customization, the server comprising:
   a processor; and
   a memory storing instructions that, when executed by the processor, cause the server to:
      detect a deployment of a new version of an application to be executed by a computing device, wherein the new version of the application includes at least one change to a user experience of a previous version of the application used by a user;
      detect a customization associated with the user experience of the previous version of the application, the customization being a modification to a functionality of the previous version of the application used by the user;
      determine a compatibility of the customization associated with the user experience of the previous version of the application with the new version of the application, the compatibility relating to an operability of the customization in the new version of the application;
      in response to a determination that the customization associated with the user experience of the previous version of the application is incompatible with the new version of the application, provide the user experience of the previous version of the application modified with the customization associated with the user experience of the previous version of the application; and
      in response to a determination that the customization associated with the user experience of the previous version of the application is compatible with the new version of the application,
         modify a user experience of the new version of the application with the customization associated with the user experience of the previous version of the application; and
         provide the modified user experience of the new version of the application.

2. The server of claim 1, wherein the memory further comprises instructions that cause the processor to:
   detect no customizations associated with the previous version of the application; and
   provide the user experience of the new version of the application.

3. The server of claim 1, wherein the customization associated with the user experience of the previous version of the application is one of: a theme customization, a color scheme customization, a shading customization, a menu customization, a button customization, a graphical scheme customization, a control element customization, a customization to a behavior of the control element, a functionality customization, a behavior customization, and a combination thereof.

4. The server of claim 1, wherein the customization is at one of a user level, a group level, or an enterprise level.

5. The server of claim 1, wherein the memory further comprises instructions that cause the processor to:
   detect the customization associated with the user experience of the previous version of the application by one or more of: identifying modifications to source code of the previous version of the application or identifying modifications to one or more modules associated with the previous version of the application.

6. The server of claim 1, wherein the computing device includes a repository configured to store a previous version list of customizations associated with the previous version of the application and the list of customizations associated with the new version of the application.

7. The server of claim 6, wherein comparing the customization to a list of customizations associated with the new version of the application includes
performing a one-to-one comparison between each customization from the previous version list of customizations to each customization from the list of customizations to determine a compatibility of each customization from the first list with each customization from the second list.

8. The server of claim 7, wherein the processor is further configured to:
implement an algorithm to perform the one-to-one comparison.

9. The server of claim 8, wherein the algorithm includes one of: a comparison-based sorting algorithm, an approximate string matching algorithm, an intelligent learning algorithm, and a machine learning algorithm.

10. A method executed on a computing device to provide an automatic detection and an optimization of user experience upgrades based on detected customization, the method comprising:
detecting a deployment of a new version of an application, wherein the new version of the application includes at least one change to a user experience of a previous version of the application used by a user;
detecting a customization associated with the user experience of the previous version of the application, the customization being a modification to a functionality of the previous version of the application used by the user, and wherein the customization is at one of a user level, a group level, and an enterprise level;
determining a compatibility of the customization associated with the user experience of the previous version of the application with the new version of the application, the compatibility relating to an operability of the customization in the new version of the application;
in response to a determination that the customization associated with the user experience of the previous version of the application is incompatible with the new version of the application, providing the user experience of the previous version of the application modified with the customization associated with the user experience of the previous version of the application; and
in response to a determination that the customization associated with the user experience of the previous version of the application is compatible with the new version of the application,
modifying a user experience of the new version of the application with the customization associated with the user experience of the previous version of the application; and
providing the modified user experience of the new version of the application.

11. The method of claim 10, further comprising:
in response to receiving a request from the user to view one of a web-page or a screen, initiating a process to determine the compatibility of the customization associated with the user experience of the previous version of the application with the new version of the application.

12. The method of claim 10, wherein the previous version of the application is a down-level version of the application.

13. The method of claim 10, further comprising:
detecting the customization associated with the user experience of the previous version of the application by one or more of: identifying modifications to metadata, identifying modifications to libraries associated with the application, or identifying modifications to modules associated with the application.

14. The method of claim 10, further comprising:
receiving a first set of customizations associated with a first user experience of the previous version of the application, wherein the first user experience is associated with a first group of users.

15. The method of claim 14, further comprising:
determining a compatibility of the first set of customizations associated with the first user experience of the previous version of the application with the new version of the application; and
in response to a determination that at least one customization of the first set of customizations is incompatible with the new version of the application, providing the first user experience of the previous version of the application modified with the first set of customizations associated with the first user experience of the previous version of the application.

16. The method of claim 14, further comprising:
detecting no features customizations within the first set of customizations associated with the first user experience of the previous version of the application; and
providing the user experience of the new version of the application to be displayed on the computing device.

17. A computing device to provide an automatic detection and an optimization of user experience upgrades based on detected customization, the computing device comprising:
one or more processors; and
a memory storing instructions that, when executed by the one or more processors, cause the computing device to:
detect a deployment of a new version of an application, wherein the new version of the application includes at least one change to a user experience of a previous version of the application used by a user;
detect a customization associated with the user experience of the previous version of the application, the customization being a modification to an operability of the previous version of the application used by the user; and wherein the customization is at one of a user level, a group level, and an enterprise level;
determine a compatibility of the customization associated with the user experience of the previous version of the application with the new version of the application, the compatibility relating to the functionality of the customization in the new version of the application;
in response to a determination that the customization associated with the user experience of the previous version of the application is incompatible with the new version of the application, provide the user experience of the previous version of the application modified with the customization associated with the user experience of the previous version of the application; and
in response to a determination that the customization associated with the user experience of the previous version of the application is compatible with the new version of the application, modify a user experience of the new version of the application with the customization associated with the user experience of the previous version of the application; and provide the modified user experience of the new version of the application.

18. The computing device of claim 17, wherein the application includes one of: a word-processing application, a spreadsheet application, a presentation application, and a notebook application.

19. The computing device of claim 17, wherein the computing device includes a repository configured to store a first list of customizations associated with the user experience of the previous version of the application and a second list of customizations associated with the user experience of the new version of the application.

20. The computing device of claim 19, wherein the application is further configured to:

perform a one-to-one comparison between each customization from the first list of customizations to each customization customized feature from the second list of customizations to determine a compatibility of each customizations from the first list with each customization from the second list, wherein an algorithm is implemented to perform the one-to-one comparison, and wherein the algorithm includes one of: a comparison-based sorting algorithm, an approximate string matching algorithm, an intelligent learning algorithm, and a machine learning algorithm.

* * * * *